3,389,685
FISH CULTURE BY SQUAWFISH POPULATION ERADICATION
Craig MacPhee, Moscow, Idaho, and Richard Ruelle, Grand Island, Nebr., assignors to the United States of America as represented by the Secretary of the Interior
No Drawing. Filed Sept. 12, 1966, Ser. No. 580,561
11 Claims. (Cl. 119—3)

This invention relates to the improvement of fish culture through control of squawfish by treating its aquatic habitats with 1,1'-methylenedi-2-naphthol, also known as (bis(2-hydroxynaphthyl)methane).

The northern squawfish (*Ptychocheilus oregonensis*) and the Umpqua squawfish (*Ptychocheilus Umpquae*), hereinafter collectively denoted as squawfish unless otherwise noted, are pest fishes which are normally found in the fresh waters of Western North America.

The squawfish has a very high reproductive potential in that a single female squawfish produces a large number of eggs. It has been estimated that females averaging 12.8, 14.5 and 20.0 inches contained 6,000, 12,000 and 59,000 eggs, respectively. In addition, a single female during her life span may spawn several times, which may occur in either lakes or streams. In the fry and juvenile stages, squawfish have an exceptionally good rate of survival as they take advantage of warm inshore areas in which large predators are not found.

Squawfish greatly reduce the populations of food and game fishes with which they compete, which usually are species of salmon and trout. The squawfish has the advantage of a much longer life span than most salmon and trout. Furthermore, it is a successful competitor for limited food supplies and also is a noted predator on salmon and trout. The result is that resident trout and salmon are scarce where squawfish populations abound.

Squawfish have always been abundant, but due to the construction of reservoirs, large shallow land areas have been flooded which provide ideal squawfish habitats. This has enabled the squawfish to thrive and greatly increase its range in tributary streams. Since squawfish have no value as a sport or commercial fish, they are considered a pest fish and constitute an aggravating problem wherever they exist with desirable species of fish.

Previous efforts to control the squawfish have involved the use of physical barriers, electrical barriers, traps, nets, and explosives designed to delay or prevent the squawfish from entering their spawning grounds. However, such methods have proven unsuitable in reducing squawfish populations and have proven costly to maintain and install.

Spot poisoning of squawfish with rotenone or toxaphene has also been ineffective in controlling squawfish numbers as any benefits are very temporary and such methods are often carried out at the expense of killing natural stocks of desirable species.

Accordingly, it is an object of this invention to protect the native populations of food and game fishes by the rapid and substantial reduction of squawfish populations.

It is another object of this invention to provide a simple and economic means for the destruction of squawfish in the immature and adult stages.

It is another object of this invention to provide a poison which will effect a substantially complete eradication of squawfish in any waters without causing significant harm to or mortality of game and food fish, or other desirable aquatic species. These and other objects will be apparent from the following description and claims.

It is a further object of this invention to control the squawfish population by means of 1,1'-methylenedi-2-naphthol.

We have found that 1,1'-methylenedi-2-naphthol is an outstanding toxin to squawfish in dilutions which are harmless to desirable aquatic species.

The following examples are illustrative of the invention:

The laboratory facilities used consisted primarily of four vats (4 ft. long x 3 ft. wide x 3 ft. deep) for fish storage and acclimation purposes and four water baths or fish assay tables (11.6 ft. long x 2.0 ft. wide x 1.2 ft. deep). The water temperature of each vat and table was individually controlled. Each fish assay table controlled the temperature of a battery of twenty identical vessels in which the assays were conducted.

The fishes were conditioned and tested at the average Fahrenheit temperatures indicated in the tables of the examples. These temperatures were accurate to within one degree. The conditioning period varied between three to twenty-four hours but most fishes were conditioned for at least an overnight period. The test fishes were starved for at least twenty-four hours prior to use and were transferred to the assay vessels two hours before the chemical was added. Each vessel contained ten liters of water which was aerated by means of a single stone air-breaker. Five fish per vessel was the common number tested.

EXAMPLE 1

Northern squawfish, chinook salmon, coho salmon, and steelhead trout were treated in the laboratory facilities for 96 hours with various concentrations of 1,1'-methylenedi-2-naphthol at a temperature of 65 degrees Fahrenheit. The results of this experiment are tabulated in Table 1.

Four vessels of five fish each were used as controls during each assay. The control fish were conditioned in the same manner as the test fish, but no chemical was added to the control vessels during the assays. The control data is the first concentration (0.0000) reported in the table.

TABLE 1.—THE TOXICITY OF 1,1'-METHYLENEDI-2-NAPHTHOL TO NORTHERN SQUAWFISH (PTYCHOCHEILUS OREGONENSIS), CHINOOK SALMON (ONCORHYNCHUS TSHAWYTSCHA), COHO SALMON (ONCORHYNCHUS KISUTCH), AND STEELHEAD TROUT (SALMO GAIRDNERI)

| Concentration, parts per million | Squawfish | | Chinook salmon | | Coho salmon | | Steelhead trout | |
|---|---|---|---|---|---|---|---|---|
| | Number of test fish | Mortality, percent | Number of test fish | Mortality, percent | Number of test fish | Mortality, percent | Number of test fish | Mortality, percent |
| 0.0000 | 20 | 0.0 | 20 | 0.0 | 10 | 0.0 | | |
| 0.0005 | 10 | 10.0 | 4 | 0.0 | 4 | 0.0 | | |
| 0.0007 | 10 | 10.0 | 4 | 0.0 | 4 | 0.0 | 4 | 0.0 |
| 0.001 | 10 | 10.0 | 4 | 25.0 | 4 | 0.0 | 4 | 0.0 |
| 0.002 | 10 | 20.0 | 4 | 0.0 | 4 | 0.0 | 4 | 0.0 |
| 0.003 | 10 | 40.0 | 4 | 0.0 | 4 | 0.0 | 4 | 0.0 |
| 0.004 | 7 | 85.7 | | | | | | |
| 0.005 | 17 | 88.2 | 4 | 0.0 | 4 | 0.0 | 4 | 0.0 |
| 0.006 | 22 | 100.0 | | | | | | |
| 0.007 | 32 | 100.0 | 4 | 0.0 | 4 | 0.0 | 4 | 0.0 |
| 0.008 | 7 | 100.0 | | | | | | |
| 0.010 | 10 | 100.0 | 4 | 0.0 | 4 | 0.0 | 4 | 0.0 |
| 0.015 | 15 | 100.0 | | | | | | |
| 0.020 | 15 | 100.0 | | | | | | |
| 0.030 | 10 | 100.0 | 4 | 0.0 | 4 | 0.0 | 2 | 0.0 |
| 0.050 | | | 10 | 20.0 | | | | |
| 0.070 | | | 10 | 0.0 | | | | |
| 0.100 | 10 | 100.0 | 14 | 0.0 | 4 | 0.0 | | |
| 0.128 | | | 20 | 15.0 | | | | |
| 0.150 | | | 10 | 0.0 | | | | |
| 0.192 | | | 20 | 20.0 | | | | |
| 0.200 | | | 10 | 20.0 | | | | |
| 0.256 | | | 20 | 10.0 | | | | |
| 0.300 | | | | | 5 | 0.0 | 10 | 10.0 |
| 0.400 | | | | | 10 | 0.0 | 10 | 0.0 |
| 0.500 | | | | | 30 | 0.0 | 9 | 11.1 |
| 0.600 | | | | | 20 | 0.0 | | |
| 0.700 | | | | | 10 | 10.0 | 10 | 0.0 |
| 1.000 | | | | | 10 | 10.0 | 10 | 30.0 |

EXAMPLE 2

Northern squawfish, chinook salmon, coho salmon and steelhead trout were treated as in Example 1 but at 60 degrees Fahrenheit. The results of this experiment are tabulated in Table 2.

TABLE 2.—THE TOXICITY OF 1,1'-METHYLENEDI-2-NAPHTHOL TO NORTHERN SQUAWFISH (PTYCHOCHEILUS OREGONENSIS), CHINOOK SALMON (ONCORHYNCHUS TSHAWYTSCHA), COHO SALMON (ONCORHYNCHUS KISUTCH), AND STEELHEAD TROUT (SALMO GAIRDNERI).

| Concentration, parts per million | Squawfish | | Chinook salmon | | Coho salmon | | Steelhead trout | |
|---|---|---|---|---|---|---|---|---|
| | Number of test fish | Mortality, percent | Number of test fish | Mortality, percent | Number of test fish | Mortality, percent | Number of test fish | Mortality, percent |
| 0.0000 | 20 | 0.0 | 20 | 0.0 | 10 | 0.0 | | |
| 0.0007 | 23 | 60.9 | | | 4 | 0.0 | 4 | 0.0 |
| 0.001 | 10 | 10.0 | | | 4 | 0.0 | 4 | 0.0 |
| 0.002 | 10 | 0.0 | | | 4 | 0.0 | 4 | 0.0 |
| 0.003 | 10 | 20.0 | | | 4 | 0.0 | 3 | 0.0 |
| 0.005 | 17 | 76.5 | | | 4 | 0.0 | 3 | 0.0 |
| 0.006 | 7 | 85.7 | | | | | | |
| 0.007 | 30 | 96.7 | | | 4 | 0.0 | 4 | 0.0 |
| 0.008 | 21 | 100.0 | | | | | | |
| 0.009 | 7 | 100.0 | | | | | | |
| 0.010 | 7 | 100.0 | | | 4 | 0.0 | 4 | 0.0 |
| 0.020 | 7 | 100.0 | | | 4 | 0.0 | 4 | 0.0 |
| 0.030 | 10 | 100.0 | | | 4 | 0.0 | 4 | 0.0 |
| 0.050 | | | 10 | 0.0 | | | | |
| 0.070 | | | 10 | 0.0 | | | | |
| 0.080 | | | 10 | 0.0 | | | | |
| 0.100 | 10 | 100.0 | 14 | 0.0 | 4 | 0.0 | 4 | 0.0 |
| 0.128 | | | 20 | 5.0 | | | | |
| 0.150 | | | 10 | 10.0 | | | | |
| 0.192 | | | 20 | 20.0 | | | | |
| 0.200 | | | 10 | 10.0 | | | | |
| 0.256 | | | 20 | 5.0 | | | | |
| 0.400 | | | | | 10 | 0.0 | 9 | 0.0 |
| 0.500 | | | | | 10 | 0.0 | 10 | 0.0 |
| 0.700 | | | | | 20 | 0.0 | 10 | 10.0 |
| 0.800 | | | | | 20 | 0.0 | | |
| 1.000 | | | | | 20 | 5.0 | 10 | 10.0 |
| 2.000 | | | | | 10 | 100.0 | 10 | 100.0 |

EXAMPLE 3

Northern squawfish, chinook salmon, coho salmon and steelhead trout were treated as in Example 1 but at 55 degrees Fahrenheit. The results of this experiment are tabulated in Table 3.

TABLE 1.—THE TOXICITY OF 1,1'-METHYLENEDI-2-NAPHTHOL TO NORTHERN SQUAWFISH (*PTYCHOCHEILUS OREGONENSIS*), CHINOOK SALMON (*ONCORHYNCHUS TSHAWYTSCHA*), COHO SALMON (*ONCORHYNCHUS KISUTCH*), AND STEELHEAD TROUT (*SALMO GAIRDNERI*)

| Concentration, parts per million | Squawfish | | Chinook salmon | | Coho salmon | | Steelhead trout | |
|---|---|---|---|---|---|---|---|---|
| | Number of test fish | Mortality, percent | Number of test fish | Mortality, percent | Number of test fish | Mortality, percent | Number of test fish | Mortality, percent |
| 0.0000 | 20 | 0.0 | 20 | 0.0 | 10 | 0.0 | | |
| 0.001 | 9 | 11.1 | | | 4 | 0.0 | 3 | 0.0 |
| 0.002 | 10 | 50.0 | | | 4 | 0.0 | 4 | 0.0 |
| 0.003 | 10 | 10.0 | | | 4 | 0.0 | 4 | 0.0 |
| 0.005 | 10 | 20.0 | | | 4 | 0.0 | 3 | 0.0 |
| 0.007 | 17 | 17.6 | | | 4 | 0.0 | 3 | 0.0 |
| 0.008 | 7 | 71.4 | | | | | | |
| 0.009 | 7 | 28.6 | | | | | | |
| 0.010 | 32 | 100.0 | | | 4 | 0.0 | 4 | 0.0 |
| 0.015 | 15 | 100.0 | | | | | | |
| 0.020 | 17 | 100.0 | | | 4 | 0.0 | 3 | 0.0 |
| 0.030 | 9 | 100.0 | | | 4 | 0.0 | 2 | 0.0 |
| 0.050 | 10 | 100.0 | | | 4 | 0.0 | 4 | 0.0 |
| 0.070 | | | 10 | 10.0 | | | | |
| 0.080 | | | 10 | 0.0 | | | | |
| 0.090 | | | 10 | 0.0 | | | | |
| 0.100 | 10 | 100.0 | 20 | 0.0 | 4 | 0.0 | 4 | 0.0 |
| 0.128 | | | 20 | 10.0 | | | | |
| 0.150 | | | 10 | 10.0 | | | | |
| 0.192 | | | 20 | 30.0 | | | | |
| 0.200 | | | 10 | 20.0 | | | | |
| 0.256 | | | 20 | 15.0 | | | | |
| 0.300 | | | 10 | 50.0 | | | | |
| 0.500 | | | | | 10 | 0.0 | 10 | 0.0 |
| 0.700 | | | | | 20 | 0.0 | 10 | 0.0 |
| 0.800 | | | | | 20 | 5.0 | | |
| 1.000 | | | | | 20 | 0.0 | 10 | 0.0 |
| 2.000 | | | | | 10 | 30.0 | 10 | 20.0 |
| 3.000 | | | | | 10 | 100.0 | 10 | 100.0 |

EXAMPLE 4

Northern squawfish, chinook salmon, coho salmon and steelhead trout were treated as in Example 1 but at 50 degrees Fahrenheit. The results of this experiment are tabulated in Table 4.

TABLE 4.—THE TOXICITY OF 1,1'-METHYLENEDI-2-NAPHTHOL TO NORTHERN SQUAWFISH (*PTYCHOCHEILUS OREGONENSIS*), CHINOOK SALMON (*ONCORHYNCHUS TSHAWYTSCHA*), COHO SALMON (*ONCORHYNCHUS KISUTCH*), AND STEELHEAD TROUT (*SALMO GAIRDNERI*)

| Concentration, parts per million | Squawfish | | Chinook salmon | | Coho salmon | | Steelhead trout | |
|---|---|---|---|---|---|---|---|---|
| | Number of test fish | Mortality, percent | Number of test fish | Mortality, percent | Number of test fish | Mortality, percent | Number of test fish | Mortality, percent |
| 0.0000 | 20 | 0.0 | 20 | 0.0 | 10 | 0.0 | | |
| 0.002 | 10 | 0.0 | | | 4 | 0.0 | 4 | 0.0 |
| 0.003 | 10 | 0.0 | | | 4 | 0.0 | 4 | 0.0 |
| 0.005 | 10 | 10.0 | | | 4 | 0.0 | 4 | 0.0 |
| 0.007 | 10 | 0.0 | | | 4 | 0.0 | 4 | 0.0 |
| 0.010 | 17 | 47.0 | | | 4 | 0.0 | 4 | 0.0 |
| 0.015 | 14 | 100.0 | | | | | | |
| 0.020 | 30 | 100.0 | | | 4 | 0.0 | 4 | 0.0 |
| 0.030 | 10 | 100.0 | | | 4 | 0.0 | 4 | 0.0 |
| 0.050 | 15 | 100.0 | | | 4 | 0.0 | 4 | 0.0 |
| 0.070 | 17 | 100.0 | 10 | 0.0 | 4 | 0.0 | 4 | 0.0 |
| 0.080 | 7 | 100.0 | 10 | 10.0 | | | | |
| 0.090 | 7 | 100.0 | 10 | 0.0 | | | | |
| 0.100 | 10 | 100.0 | 20 | 5.0 | 4 | 0.0 | 4 | 0.0 |
| 0.128 | | | 20 | 10.0 | | | | |
| 0.150 | | | 10 | 20.0 | | | | |
| 0.192 | | | 20 | 0.0 | | | | |
| 0.200 | | | 10 | 40.0 | | | | |
| 0.256 | | | 20 | 0.0 | | | | |
| 0.300 | | | 10 | 20.0 | | | | |
| 0.700 | | | | | 20 | 0.0 | | |
| 0.800 | | | | | 20 | 0.0 | | |
| 1.000 | | | | | 20 | 0.0 | 10 | 10.0 |
| 2.000 | | | | | 10 | 10.0 | 10 | 0.0 |
| 3.000 | | | | | 10 | 60.0 | 10 | 100.0 |
| 4.000 | | | | | 10 | 100.0 | 10 | 100.0 |

EXAMPLE 5

Northern squawfish were exposed to small doses of 1,1'-methylenedi-2-naphthol for 96 hours at temperatures of 65, 60, 55 and 50 degrees Fahrenheit. Mortality and average time till death were measured. The results are tabulated in Table 5.

TABLE 5.—THE NUMBERS OF SURVIVORS AND THE RESISTANCE INTERVALS OF NORTHERN SQUAWFISH WHICH DIED WHEN EXPOSED FOR FOUR DAYS TO SMALL DOSES OF 1,1'-METHYLENEDI-2-NAPHTHOL IN WATER FROM ROCHAT CREEK. THE SOLID LINES REPRESENT THE APPROXIMATE 100 PERCENT MORTALITY LEVEL OR $LD_{100}$ FOR TEMPERATURES OF 50, 60, AND 65 DEGREES FAHRENHEIT, AND THE APPROXIMATE 99 PERCENT MORTALITY LEVEL OR $LD_{99}$ FOR A TEMPERATURE OF 55 DEGREES FAHRENHEIT.

| Concentration, p.p.m. | Temperature, 65° F. | | | Temperature, 60° F. | | | Temperature, 55° F. | | | Temperature, 50° F. | | |
|---|---|---|---|---|---|---|---|---|---|---|---|---|
| | Numbers | | Average time to death, hr. | Numbers | | Average time to death, hr. | Numbers | | Average time to death, hr. | Numbers | | Average time to death, hr. |
| | Alive | Dead | | Alive | Dead | | Alive | Dead | | Alive | Dead | |
| 0.0000 | 20 | 0 | | 20 | 0 | | 20 | 0 | | 20 | 0 | |
| 0.0005 | 9 | 1 | 10.8 | | | | | | | | | |
| 0.0007 | 9 | 1 | 2.3 | 9 | 14 | 13.4 | | | | | | |
| 0.001 | 9 | 1 | 8.2 | 9 | 1 | 11.9 | | | | | | |
| 0.002 | 8 | 2 | 17.7 | 10 | 0 | | 8 | 1 | 20.6 | | | |
| 0.003 | 6 | 4 | 4.0 | 8 | 2 | 10.0 | 5 | 5 | 34.0 | 10 | 0 | |
| 0.004 | 1 | 6 | 11.6 | | | | 9 | 1 | 1.6 | 10 | 0 | |
| 0.005 | 2 | 15 | 7.2 $LD_{100}$ | 4 | 13 | 9.1 | 8 | 2 | 12.0 | 9 | 1 | 6.7 |
| 0.006 | 0 | 22 | 5.8 | 1 | 6 | 13.6 | | | | | | |
| 0.007 | 0 | 32 | 6.0 | 1 | 30 | 11.0 $LD_{100}$ | 14 | 3 | 21.2 | 10 | 0 | |
| 0.008 | 0 | 7 | 5.3 | 0 | 21 | 8.4 | 2 | 5 | 48.5 | | | |
| 0.009 | | | | 0 | 7 | 9.0 | 5 | 2 | 27.3 $LD_{99}$ | | | |
| 0.010 | 0 | 10 | 4.3 | 0 | 7 | 4.4 | 0 | 32 | 12.0 | 9 | 8 | 18.1 $LD_{100}$ |
| 0.015 | 0 | 15 | 3.3 | | | | 0 | 15 | 8.9 | 0 | 14 | 31.3 |
| 0.020 | 0 | 15 | 3.1 | 0 | 7 | 5.0 | 0 | 17 | 8.1 | 0 | 30 | 19.6 |
| 0.030 | 0 | 10 | 3.7 | 0 | 10 | 5.5 | 0 | 9 | 7.0 | 0 | 10 | 17.8 |
| 0.050 | | | | | | | 1 | 9 | 20.0 | 0 | 7 | 11.5 |
| 0.070 | | | | | | | | | | 0 | 7 | 11.8 |
| 0.080 | | | | | | | | | | 0 | 7 | 13.8 |
| 0.090 | | | | | | | | | | 0 | 7 | 12.5 |
| 0.100 | 0 | 10 | 2.4 | 0 | 10 | 4.1 | 0 | 10 | 6.1 | 0 | 10 | 11.4 |

EXAMPLE 6

Umpqua squawfish were treated as in Example 5. The results are tabulated in Table 6.

TABLE 6.—THE NUMBER OF SURVIVORS AND THE RESISTANCE INTERVALS OF UMPQUA SQUAWFISH (*PTYCHOCHEILUS UMPQUAE*) WHICH DIED WHEN EXPOSED FOR 96 HOURS TO SMALL DOSES OF 1,1'-METHYLENEDI-2-NAPHTHOL.

| Concentration, p.p.m. | Temperature, 65° F. | | | Temperature, 60° F. | | | Temperature, 55° F. | | | Temperature, 50° F. | | |
|---|---|---|---|---|---|---|---|---|---|---|---|---|
| | Numbers | | Average time to death, hr. | Numbers | | Average time to death, hr. | Numbers | | Average time to death, hr. | Numbers | | Average time to death, hr. |
| | Alive | Dead | | Alive | Dead | | Alive | Dead | | Alive | Dead | |
| 0.0000 | 14 | 1 | 68.6 | 15 | 0 | | 15 | 0 | | 15 | 0 | |
| 0.007 | 0 | 15 | 16.1 | | | | | | | | | |
| 0.008 | 1 | 14 | 10.9 $LD_{100}$ | | | | | | | | | |
| 0.010 | 0 | 15 | 6.5 | 3 | 12 | 8.8 $LD_{100}$ | | | | | | |
| 0.015 | 0 | 10 | 5.3 | 0 | 15 | 7.6 | 2 | 13 | 18.7 $LD_{100}$ | | | |
| 0.020 | | | | 0 | 10 | 7.9 | 0 | 15 | 15.0 | 1 | 13 | 33.9 $LD_{100}$ |
| 0.030 | | | | | | | 0 | 28 | 11.6 | 0 | 15 | 20.9 |
| 0.040 | | | | | | | | | | 0 | 15 | 17.6 |
| 0.050 | | | | | | | | | | 0 | 10 | 19.6 |
| 0.100 | | | | | | | 0 | 3 | | | | |

Table 1 shows that in a 96-hour assay at 65 degrees Fahrenheit a 100 percent mortality of northern squawfish was achieved at a concentration of 0.006 p.p.m. but no appreciable mortality occurred in the salmon or trout at concentrations below 0.100 p.p.m.

Table 2 shows a 100 percent mortality of northern squawfish was achieved at a concentration of 0.008 p.p.m. at a temperature of 60 degrees Fahrenheit with no appreciable mortality occurring in the salmon or trout below 0.150 p.p.m.

Table 3 shows a 100 percent mortality of northern squawfish at a concentration of 0.010 p.p.m. and a temperature of 55 degrees Fahrenheit with no appreciable harm to salmon or trout below 0.128 p.p.m.

Table 4 shows a 100 percent mortality of northern squawfish with 0.015 p.p.m. at a temperature of 50 degrees Fahrenheit with no appreciable damage to salmon or trout below 0.100 p.p.m.

Table 5, with minor exceptions, shows that both the dosage required for 100 percent mortality and average time till death are inversely related to the water temperatures for northern squawfish.

Table 6 shows the lethal effect of 1,1'-methylenedi-2-naphthol on Umpqua squawfish and shows that both the dosage required for 100 percent mortality and the average time till death increase as the temperature decreases.

EXAMPLE 7

A shallow lagoon at the mouth of Rochat Creek near St. Maries, Idaho was treated with 0.75 pound of 1,1'-methylenedi-2-naphthol. The lagoon had a surface area of approximately 1½ acres and a volume of about 5 acre-feet. Rochat Creek flowed through one end of the lagoon at a rate of 4 c.f.s. The treatment took place between 1400 and 1700 hours and the surface temperature of the water remained a constant 61 degrees Fahrenheit during the 3-hour treatment.

The lagoon was screened at the inlet and outlet to prevent the fish from escaping.

A 1½ inch gasoline-driven, water pump was used for mixing the chemical in the still waters of the lagoon. The intake hose was pierced and a 25 milliliter burette was inserted near its point of attachment with the pump so that the amount of chemical entering the pump would be regulated. The pump was placed in a small boat and the end of the outlet hose was held under the surface of the water so that the chemical would have a better chance of dissolving in the lagoon water.

At the inlet, a 50-milliliter burette was used to regulate the input of the chemical into the stream. A short piece of tubing was attached to the outlet of the burette so that the chemical was forced to escape underwater. After the prescribed amount of chemical had been metered into the stream, the water below the burette was thoroughly mixed by circulating it through a pump.

The inlet stream was simultaneously treated with 0.05 p.p.m. of toxin and treatment of the inlet stream continued for two hours after the lagoon was treated.

Four and one-half hours after the start of the treatment, four northern squawfish were found dead in the treated area. The following morning numerous dead squawfish were observed on the bottom of the lagoon. Fifty of the dead squawfish were recovered and identified. No live squawfish were seen and no dead fish of any other species were found.

This field trial demonstrates that squawfish populations can be successfully controlled in their natural habitat.

EXAMPLE 8

Two ducks and one sheep were administered 1 p.p.m. of 1,1'-methylenedi-2-naphthol and another two ducks and one sheep were given 10 p.p.m. of the compound in their drinking water for a one week period and all animals were kept under observation.

No visible ill effects were observed with either the ducks or sheep. Since these doses were many times more potent than those contemplated, and since normally the dosage would not be held in a stream or lake for more than one day it appears very unlikely that mammals or fowl would be harmed through the use of 1,1-methylenedi-2-naphthol.

Additional tests have shown that 1,1'-methylenedi-2-naphthol is not toxic to rainbow trout, cutthroat trout, eastern brooktrout, crappies, perch, dace, suckers, shiners, catfish, sculpin, stonefly and mayfly, at concentrations up to 0.1 p.p.m.

The optimum range of concentration of 1,1'-methylenedi-2-naphthol varies with temperature and species of compared fish. From the foregoing tables it can be seen that at any temperature from 50 to 65 degrees Fahrenheit there is a range of concentrations in which the toxin will achieve a 100 percent mortality of squawfish without any harmful effects on salmon or trout. It is preferable that a concentration within this range be chosen. However, conditions may warrant using more or less than the preferred amount.

In combating the squawfish in accordance with our invention, it is desirable that 1,1'-methylenedi-2-naphthol be added to the stream, pond or lake so that concentrations will be substantially uniform throughout the water system. Thus, the natural flow and movement of the water and/or the method of application may serve to facilitate the dispersion and mixing and may reduce the amount of labor and equipment necessary for securing and maintaining the desired conditions.

The amount of 1,1'-methylenedi-2-naphthol required did not depend to any appreciable extent upon the size or weight of the fish treated but appears to be equally lethal to squawfish of all sizes.

In treating a stream, pond or lake, 1,1'-methylenedi-2-naphthol may be added directly to the water in the form of a fine powder, with or without suitable wetting or conditioning agents to facilitate dispersal and/or solution. Alternatively, the compound may be added in liquid form, as solutions, suspensions, or emulsions. In general, aqueous solutions or dispersals are preferred as the application and mixing are more readily effected. The 1,1'-methylenedi-2-naphthol may be dissolved in acetone or other water miscible solvents or it may be added in the form of a concentrated aqueous suspension prepared from solutions of acetone or the like.

Alkali salts of 1,1'-methylenedi-2-naphthol may also be used as toxins for squawfish. In addition, any compound which will hydrolyze or dissociate to form 1,1'-methylenedi-2-naphthol at the pH of the aqueous habitat may be used.

A single treatment in accordance with the foregoing description and examples should substantially destroy all squawfish inhabiting a given lake, pond or stream, however, multiple treatments may be used whenever it appears necessary.

What is claimed is:

1. A method of fish culture comprising controlling the squawfish population in an aqueous habitat comprising squawfish and at least one member selected from the group comprising coho salmon, chinook salmon, steelhead trout, rainbow trout, cutthroat trout, crappies, perch, dace, suckers, shiners, catfish, and sculpin, by treating the aqueous habitat with 1,1'-methylenedi-2-naphthol in an amount from about 0.004 to 0.100 p.p.m. which is lethal to the squawfish but not lethal to said selected members of said group.

2. The method of claim 1 wherein the 1,1'-methylenedi-2-naphthol is dissolved in a water miscible solvent before addition to the aqueous habitat.

3. The method of claim 1 wherein said group consists of coho salmon, chinook salmon and steelhead trout.

4. The method of claim 3 wherein the concentration of 1,1'-methylenedi-2-naphthol is from about 0.004 to 0.150 p.p.m.

5. The method of claim 4 wherein the aqueous habitat is at a temperature of from about 50 to 65 Fahrenheit, and wherein the higher the temperature the lower the concentration of 1,1'-methylenedi-2-naphthol required.

6. The method of claim 4 wherein the 1,1'-methylenedi-2-naphthol is dissolved in a water miscible solvent before addition to the aqueous habitat.

7. The method of claim 3 wherein the member of the group is chinook salmon and the amount of 1,1'-methylenedi-2-naphthol is from about 0.004 to 0.100 p.p.m.

8. The method of claim 3 wherein the member of the group is coho salmon and the amount of 1,1'-methylenedi-2-naphthol is from about 0.004 to 1.00 p.p.m.

9. The method of claim 3 wherein the member of the group is steelhead trout and the amount of 1,1'-methylenedi-2-naphthol is from about 0.004 to 1.00 p.p.m.

10. The method of claim 1 wherein said treating of the aqueous habitat with 1,1'-methylenedi-2-naphthol is accomplished by adding to said aqueous habitat a compound which hydrolyzes to form 1,1'-methylenedi-2-naphthol.

11. The method of claim 4 wherein said treating of the aqueous habitat with 1,1'-methylenedi-2-naphthol is accomplished by adding to said aqueous habitat a compound which hydrolyzes to form 1,1'-methylenedi-2-naphthol.

References Cited

UNITED STATES PATENTS

| | | | |
|---|---|---|---|
| 2,181,882 | 12/1939 | Flower | 119—4 |
| 2,828,244 | 3/1958 | Fonner et al. | 167—65 |
| 2,963,400 | 12/1960 | Ross | 167—53 |
| 3,110,285 | 11/1963 | Greenough | 119—3 |
| 3,238,098 | 3/1966 | Howell | 167—46 |
| 3,306,256 | 2/1967 | Lewis | 119—3 |
| 3,311,535 | 3/1967 | Whipp | 119—3 X |
| 3,328,244 | 6/1967 | Shadbolt | 167—46 |
| 3,331,356 | 7/1967 | Eckstein | 119—3 |

ALDRICH F. MEDBERY, *Primary Examiner.*